United States Patent Office 2,712,476
Patented July 5, 1955

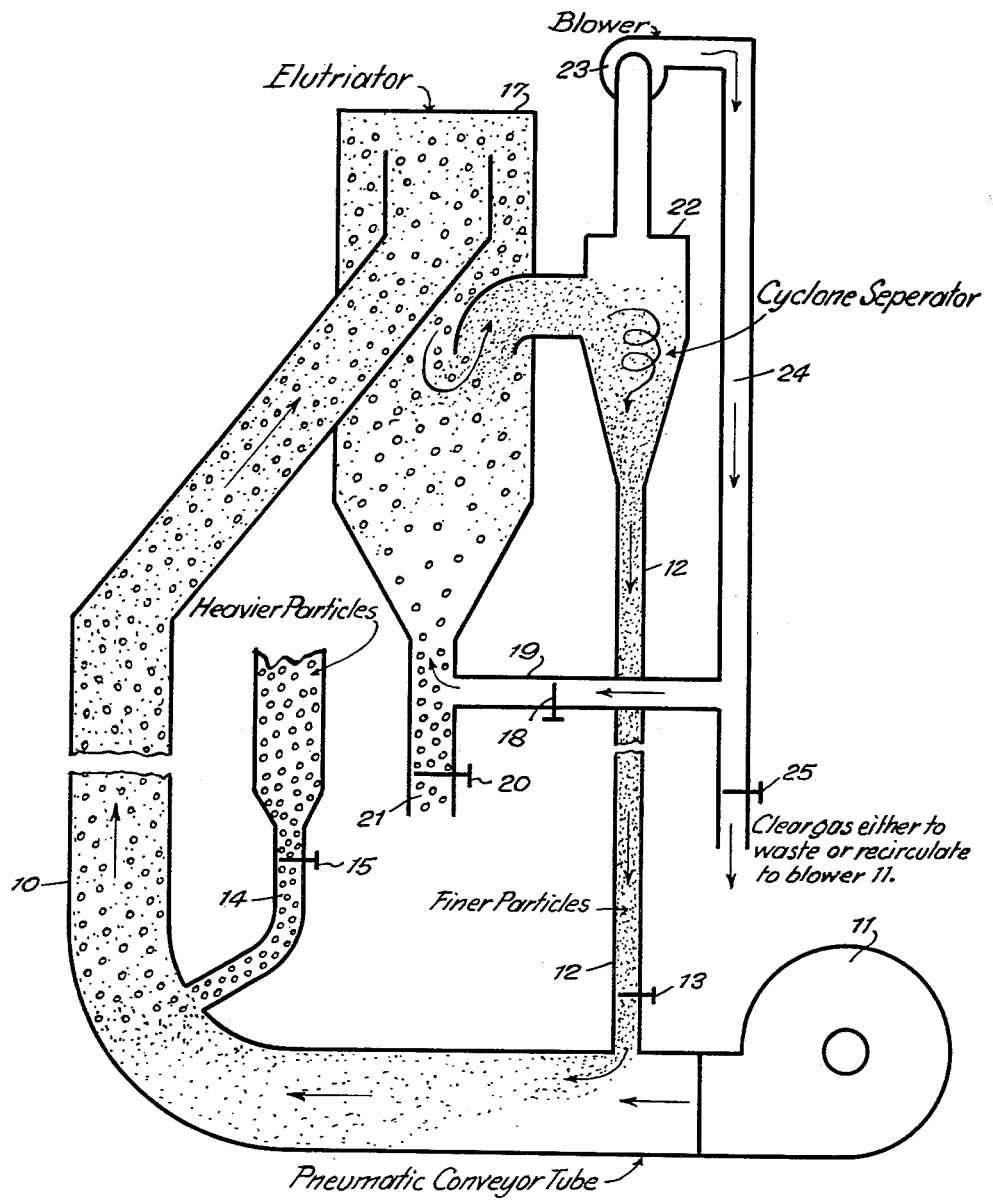

2,712,476
METHOD OF CONVEYING GRANULAR SOLIDS
John Happel, Brooklyn, N. Y.

Application April 24, 1950, Serial No. 157,787

5 Claims. (Cl. 302—53)

The present invention relates to the art of conveying solids in pellet or granulated form.

Systems or industrial processes employing contact between solids and fluids as an essential part of the operation are common. In some of these systems, where for example, vapors are contacted with catalytic and/or heating media, it is desirable to have the solids in finely divided form. Also, it is advantageous in some of these systems for continuous operation, to effect continuous movement of the solids to suitable elevated stations, as for example to contactors or regenerators.

Two methods are now in use for the purpose of conveying solids in granulated or subdivided form. In the so-called TCC units widely used in catalytic cracking operations in the oil industry, bucket elevators are employed for positively conveying the heating or catalytic solids to the top of the regenerator and contactor, whence the solids flow downward under the influence of gravity countercurrent to air or hydrocarbon vapor stream. However, where high capacities and temperatures are required or the conveyance of the solids to a higher elevation is necessary, the cost of erecting a suitable elevator for the purpose becomes very costly and oftentimes prohibitive. Therefore, it has been found desirable under these conditions for the latest TCC installations and for plants employing the Houdriflow process (a cracking process which also employs moving beds for the contacting of vapors with catalyst), to use pneumatic conveying means. Such a system is inherently simpler than the bucket elevator, but requires the gas or air air used as the conveying means to move at high rates relative to the solid particles to be carried or transported and requires the particles themselves to move at high rates relative to the conveyor pipe in order to secure smooth operation. This results in high attrition losses, which are undesirable, especially when handling the expensive catalyst material normally employed.

For very fine particles, the so-called fluidized technique is sometimes employed in catalytic cracking and contacting operations. This is essentially a form of pneumatic conveyance. However, in view of the small particles employed, the gas velocity required is so small and the random collision of the moving particles is so insignificant, that the particles appear to move like a liquid. With such small particles, the low gas velocity necessary to float them results in less violent agitation. Moreover, these small particles can usually be smoothly conveyed at a density greater than that in the case of larger particles.

The smooth conveyance of large particles is possible as the specific gravity of the conveying fluid is increased and as it approaches that of the solid particles being conveyed. If the density of the fluid exceeded that of the solid particles, the particles would rise through it without the necessity of imparting velocity to the fluid. Such a situation would prevail in the case of very high pressure gases or liquids conveying solid particles of relatively low specific gravity. However, in the case of the usual catalyst conveying system, it is inconvenient and undesirable to use a liquid or to employ high pressures for the purpose of transporting the solid particles to an elevated station.

One object of the present invention is to provide a new and improved method of pneumatically transporting solid particles at comparatively low velocity with consequent reduction of attrition losses.

Another object is to provide new and improved means for pneumatically transporting solid particles at comparatively low velocity with consequent reduction of attrition losses.

In accordance with certain features of the process of the present invention, a pneumaticized or fluidized bed substantially in the form of fine particles is employed as the carrier or conveying medium for the larger particles to be transported vertically or from one place or station to another. As far as certain aspects of the invention are concerned, the larger and the smaller carrier particles could be of the same material. However, it is desirable that the smaller particles be of greater specific gravity to obtain better results.

The creation of a pneumaticized bed of small carrier or conveyor particles for the larger particles may be accomplished by creating an air or gas or vapor current, in which is fed finely powdered material, such as powdered clay, alumina, carbon or other suitable non-abrasive substance, to form a relatively thick cloud of air or gas and powder. Into this particle laden air or gas current is introduced the larger particles which are to be transported and which may constitute heating and/or catalytic agents or which may be of any other particles such as wheat, corn, coal, ores and the like according to the use for which the conveying system is to be employed. The heavier particles by this process are floated on the finer particles and are lifted thereby at a velocity less than that of the air or gas and of the finer particles. As a result, the comparatively heavy particles are transported smoothly with minimum of attrition losses, the superficial velocity of the gas employed being so low that in the absence of the pneumaticized bed of smaller particles, the heavy particles could not be transported by the gas.

At an elevated or other station, the smaller particles may be separated from the heavier particles and recirculated to the inlet end of the conveyor pipe. The separated larger particles may be regenerated or conveyed or otherwise treated or reused.

If desired, the pneumaticized smaller conveying particles, instead of being injected at one inlet station into the air or gas current, may be injected at several points along the path of this current.

Various other objects, features and advantages of the invention will be apparent from the following particular description and from an inspection of the accompanying drawing showing diagrammatically a pneumatic conveying system embodying the structural features of the invention and showing the manner in which the method of the present invention may be carried out.

Referring to the drawing, there is shown a system requiring the transportation of solid particles to an elevated position. The system illustrated is part of a catalytic oil cracking process in which the particles constitute the catalyst or part of a process involving high temperature pyrolysis, in which the particles constitute the heating medium and also perhaps the catalyst. The particles are too big to be transported smoothly by simple pneumatic conveying means without undesirable attrition and/or are too hot to be handled by elevators.

Although the invention is especially suitable for the purposes indicated, as far as certain aspects of the invention are concerned, it may be employed in any case where it is desired to transport solid particles with minimum of attrition losses as, for example, in the transportation of wheat, corn, coal, ores, etc.

The system shown in the drawing comprises a conveyor tube 10 having a vertical section through which the solid particles are adapted to be transported vertically to an upper level for regeneration, contact or other operations. At the inlet lower end of this tube 10 is a blower 11 for creating a pneumatic current desirably of air through said tube. Connecting into the outlet end of this blower 11 near the lower end of the pneumatic conveyor tube 10 is a pipe 12 for feeding solid particles in finely divided form and preferably in powdered form, under the control of a valve 13. These particles may, for example, be powdered clay or any other suitable material which is not too abrasive and are more minute than the particles to be transported. Enough of these finer particles are injected into the pneumatic current to form a relatively thick fluid combination of air and powder. Into this powder laden pneumatic current, there is introduced the larger solid particles through a pipe 14 connecting into the lower end of the conveyor tube 10 on the down-stream side of the section where the pipe 12 feeds into said tube. The feeding of these larger particles into the conveyor tube 10 is controlled by a suitable valve 15.

The larger particles fed into the pneumatic current laden with the finer particles are lifted upwardly through the conveyor tube 10 by the combined air and finer particles at a constant velocity substantially lower than that of the air or of the finer particles. The reduced velocity with which the larger particles are carried by the pneumatic current causes smooth lifting operation with minimum of attrition losses.

The larger particles are carried in the manner described to an elevated station where the finer conveying particles are separated from the larger particles. This station may contain a separating device, which as far as certain aspects of the invention are concerned may be of any suitable type well known in the art. For example, the finer conveying particles may be screened from the coarser material or if the particles were different in specific gravity, they could be separated by flotation employing a liquid separating agent. However, one of the simplest and practical schemes useable would be by a combination of gaseous elutriation and centrifugal separation as described in the drawing. Other schemes may be employed.

In the system of separation shown in the drawing, the particles moving up the conveyor tube 10 would pass to an elutriator 17 having a diameter large enough, so that the larger particles would readily drop to the bottom. The smaller particles would be prevented from settling by means of a stream of gas admitted to the bottom of the elutriator 17 through a control valve 18 in a line 19. The gas for this purpose may be obtained from a separator source as will be described or may be supplied from an independent source, or as recycled after removal of the powder.

The larger particles free from the finer conveying particles and settling at the bottom of the elutriator 17 would pass through a valve 20 and be discharged through an outlet 21 at a higher level than its original position or at a feed point located at a station different from that of its original one. The separated larger particles may be taken from the outlet 21 to any destination desired. For example, in the case of a catalytic oil cracking system, the larger particles may be delivered to the top of a contactor (not shown), picked up at the bottom of the contactor, sent to the top of the regenerator (not shown), and picked up at the bottom of the regenerator for recycling in the contactor. Somewhere during the cyling operation, the larger particles may be returned to the pipe 14 for recirculation through the system.

The finer conveying particles separated in the elutriator 17 together with the gas generated by the blower 11 pass into a cyclone separator 22 where they would be given a whirling centrifugal action. By this means, the particles and the gas would be separated. The separated solid particles would be discharged from the bottom of the separator 22 into the line 12 for recirculation. The separated gas or vapor free from the solid particles would pass through a suction blower 23 through a line 24 and through a valve 25 to waste or to the inlet of the blower 11 for recirculation. Part of this gas or vapor is delivered through the line 19 into the bottom of the elutriator 17 for recirculation. Such recirculation of the gas would be desirable where it was under high pressure or where it has a high temperature in order to avoid repressuring or reheating of this gas.

The smaller particles, instead of being introduced into the pneumatic current at a single entry point in the conveyor tube 10, may be injected at several points along said tube.

Assume for purposes of illustration that alumina pellets 0.1 inches in diameter are to be conveyed and that a fine powder of the same material is available for conveying. If air alone at atmospheric temperature and pressure was used as the conveying material, it would be necessary to move the particles at a velocity of about 10 feet per second in a vertical line and the air at a superficial velocity of about 25 feet per second in order to secure smooth conveyance in a mixture containing 10% by volume of the solid particles. Higher concentrations of solid particles would not usually be smoothly conveyed. Under the same conditions, i. e., 10% concentration of the solid particles in a powder stream, if a conveying mixture containing 15 to 20% by volume of the powder per unit volume of conveying mixture were used, smooth conveyance would be possible at a particle velocity of 0.5 foot per second, the superficial powder and air or fluid mixture having a velocity of 1.8 feet per second and the superficial air velocity for a line of the same cross-section before admitting the powder or the pellets to be conveyed being 2.5 feet per second, which velocity would be insufficient in the absence of the finer particles, to transport the heavy particles. The advantage of this slower smooth conveyance of the pellets would be less breakage thereof.

In some instances the blower 23 can be eliminated and a "take off" from blower 11 to line 19 will create enough pressure to supply vapor through line 19. Also, it will be understood that the blower 23 may be eliminated and a separate outside blower connected to line 19 to introduce the vapor into the elutriator 17.

It will also be noted that with this preferred type of apparatus and the method of procedure that the heavier particles are readily moved without attrition from one point to another, whether vertically or on the slant.

Also, it will be understood that while the small particles such as powdered clay, alumina, carbon have been specifically pointed out, other powders of similar nature may be employed, such as mullite, titanium oxide, zirconium oxide, zirconium silicate, and any other high melting point refractories. Some of these materials in their larger particle sizes may be material which is to be positively conveyed. Also in respect to the use of carbon powder, it will be understood that carbon black product in its several sizes may also be employed as either the fine powder, or in its larger sizes may be the larger particles to be conveyed.

While the invention has been described with particular reference to a specific embodiment, it is to be understood that it is not to be limited thereto, but is to be construed broadly and restricted solely by the scope of the appended claims.

What is claimed is:

1. A method of transporting solid particles from one station to another and for reducing attrition losses of said particles during such transportation of said particles, which comprises creating between said stations a current of gas having a velocity insufficient by itself to transport the solid particles between said stations, said current of gas being laden with solid particles finer than the first mentioned particles and in sufficient concentration to float said first mentioned particles in said current when said first mentioned particles are introduced in said current and to transport said first mentioned particles when injected into said current, and injecting the first mentioned particles into said current for conveyance thereby at a velocity less than that of the gas and of the finer particles in said current.

2. A method of transporting solid particles from one station to another, as described in claim 1, comprising separating the finer particles from the first mentioned particles after said first mentioned particles have been transported between said stations, and recirculating the finer particles into said gas current.

3. A method of transporting solid particles from one station to another as described in claim 1, wherein the first mentioned particles are injected into said gas current at a region spaced a substantial distance from and on the downstream side of the region where said finer particles are fed.

4. In a catalyst contacting process, the method of transporting the catalyst in the form of solid particles from one station to another and for reducing attrition losses of said catalyst during such transportation of said catalyst, which comprises creating between said stations a current of gas having a velocity insufficient by itself to transport the catalyst between said stations, said current of gas being laden with solid particles finer than said catalyst and in sufficient concentration to float said catalyst in said current when said catalyst is introduced in said current and to transport said catalyst when injected into said current, and injecting said catalyst into said current for conveyance thereby at a velocity less than that of the gas and of the finer particles in said current.

5. In a heating process, the method of transporting the heating medium in the form of hot solid particles from one station to another and for reducing attrition losses of said heating medium, which comprises creating between said stations a current of gas having a velocity insufficient by itself to transport the heating medium between said stations, said current of gas being laden with solid particles finer than said heating medium and in sufficient concentration to float said heating medium in said current when said heating medium is introduced in said current and to transport said heating medium when injected into said current, and injecting said heating medium into said current for conveyance thereby at a velocity less than that of the gas and of the finer particles in said current.

References Cited in the file of this patent

UNITED STATES PATENTS

| | | |
|---|---|---|
| 1,825,707 | Wagner | Oct. 6, 1931 |
| 2,321,015 | Davis | June 8, 1943 |
| 2,377,512 | Page | June 5, 1945 |
| 2,411,208 | Hall et al. | Nov. 19, 1946 |
| 2,411,996 | Kassel | Dec. 3, 1946 |
| 2,423,813 | Lechthaler et al. | July 8, 1947 |
| 2,440,475 | Jacomini | Apr. 27, 1948 |
| 2,461,104 | Bates | Feb. 8, 1949 |
| 2,483,485 | Barr | Oct. 5, 1949 |
| 2,517,042 | Skelly | Aug. 1, 1950 |
| 2,526,486 | Krebs | Oct. 17, 1950 |
| 2,580,581 | Niemitz | Jan. 1, 1952 |